(12) United States Patent
Dande et al.

(10) Patent No.: US 12,190,373 B2
(45) Date of Patent: Jan. 7, 2025

(54) MULTI-COMPUTER SYSTEM FOR FAIL-SAFE EVENT PROCESSING

(71) Applicant: Bank of America Corporation, Charlotte, NC (US)

(72) Inventors: Pratap Dande, Saint Johns, FL (US); Erik Dahl, Newark, DE (US); Rahul Yaksh, Austin, TX (US); Tileshia Brenda Alford, Charlotte, NC (US); Steven Allan Reich, Manalapan, NJ (US); Vishwanath Prasad Karra, Mckinney, TX (US); Sailesh Vezzu, Hillsborough, NJ (US)

(73) Assignee: Bank of American Corporation, Charlotte, NC (US)

( * ) Notice: Subject to any disclaimer, the term of this patent is extended or adjusted under 35 U.S.C. 154(b) by 48 days.

(21) Appl. No.: 18/076,710

(22) Filed: Dec. 7, 2022

(65) Prior Publication Data

US 2024/0193680 A1    Jun. 13, 2024

(51) Int. Cl.
*G06Q 40/03* (2023.01)

(52) U.S. Cl.
CPC .................................. *G06Q 40/03* (2023.01)

(58) Field of Classification Search
USPC .......................................................... 705/38
See application file for complete search history.

(56) References Cited

U.S. PATENT DOCUMENTS

| | | |
|---|---|---|
| 6,339,766 B1 * | 1/2002 | Gephart .......................... 705/44 |
| 7,970,705 B2 | 6/2011 | Patterson |
| 9,607,334 B2 | 3/2017 | Carroll et al. |
| 10,223,677 B2 | 3/2019 | Zamer |
| 11,151,529 B1 | 10/2021 | Nolte et al. |
| 2005/0160043 A1 * | 7/2005 | Reno .............................. 705/50 |
| 2010/0174639 A1 * | 7/2010 | Melik-Aslanian et al. .... 705/38 |
| 2016/0171493 A1 | 6/2016 | Kapur et al. |

(Continued)

OTHER PUBLICATIONS

M.E. Peters, Emerging eCommerce Credit and Debit, Jan. 1, 2002, Proceedings, Third International Symposium on Electronic Commerce, 2002, pp. 39-46. (Year: 2002).*

(Continued)

*Primary Examiner* — Scott C Anderson
*Assistant Examiner* — George N. Proios
(74) *Attorney, Agent, or Firm* — Banner & Witcoff, Ltd.

(57) ABSTRACT

Arrangements for providing fail-safe event processing functions are provided. In some aspects, an account may be generated and a first account number associated with a payment device of the account may be generated. The first account number may be transmitted or sent to the user. A second account number, different from the first account number, may be generated and stored by the enterprise organization in an inactive state. A user may request recurring payments with one or more vendors and may provide the first account number for use in processing the payments. An issue may be detected with the first account number or associated payment device. If a creditworthiness score meets or exceeds a threshold, the second account number may be activated and used (e.g., by the enterprise organization) to process recurring payments that may otherwise have lapsed due to the compromise of the first account number or payment device.

15 Claims, 12 Drawing Sheets

(56) References Cited

U.S. PATENT DOCUMENTS

2018/0121966 A1\* 5/2018 Schmidt et al.
2021/0004898 A1\* 1/2021 Kanjlia et al.
2021/0049683 A1\* 2/2021 Jones et al.

OTHER PUBLICATIONS

Dr. Sumanjeet, Emergence of payment systems in the age of electronic commerce: The state of art, Nov. 1, 2009, First Asian Himalayas International Conference on Internet, pp. 1-18. (Year: 2009).\*

\* cited by examiner

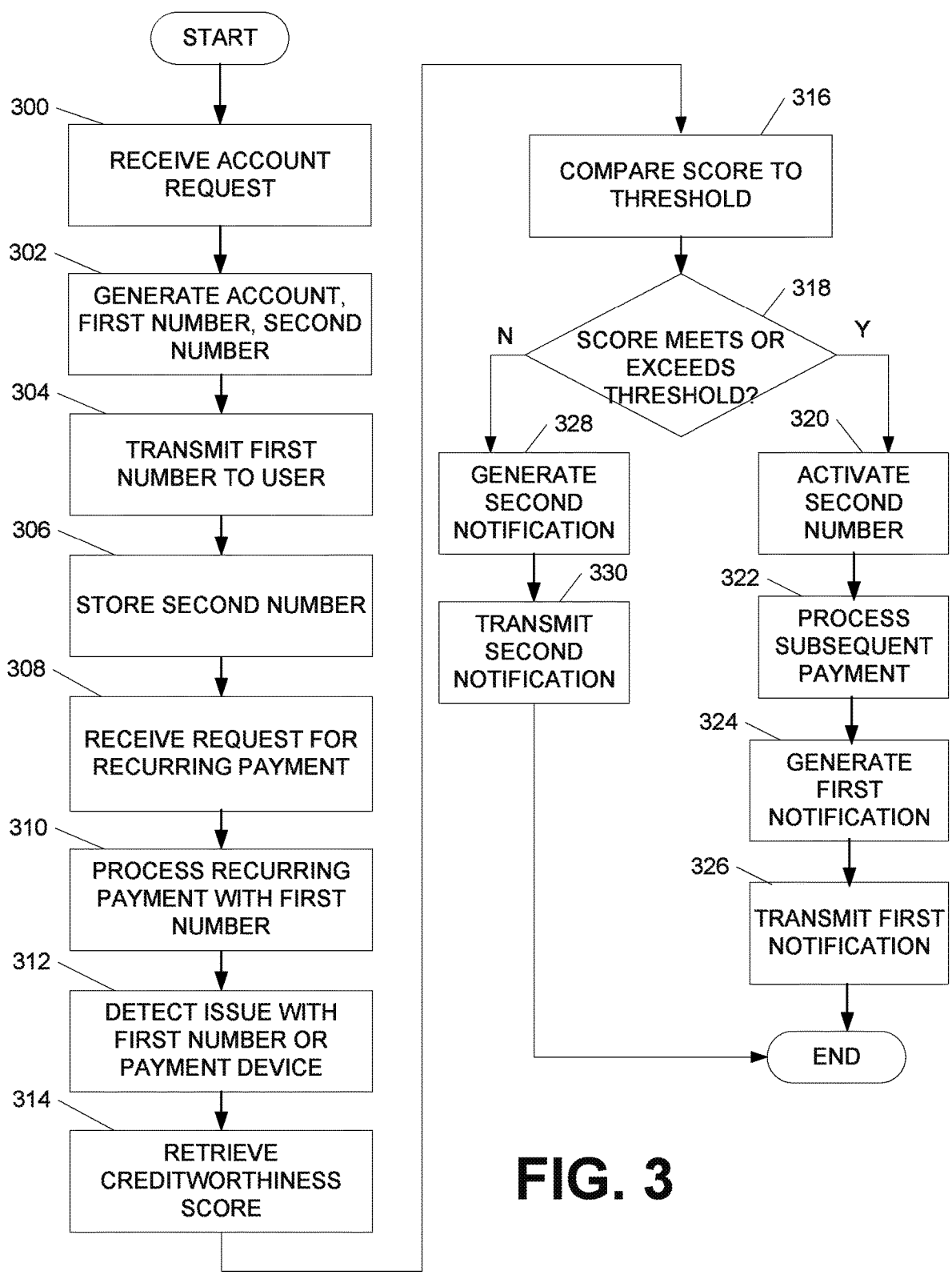

MULTI-COMPUTER SYSTEM FOR FAIL-SAFE EVENT PROCESSING

BACKGROUND

Aspects of the disclosure relate to electrical computers, systems, and devices for providing fail-safe event processing.

Users often schedule recurring bill payments for one or more bills or invoices that are received on a regular basis (e.g., monthly utility bills, quarterly bills, or the like). Users may provide an account number or payment device (e.g., credit card, debit card, or the like) information (e.g., payment device number, expiration date, card verification value CVV), or the like when scheduling these recurring payments and the payment may be automatically processed using the account number and/or payment device number provided. However, when unauthorized activity is detected with a payment device or account, or if a payment device has expired, a recurring payment might not post as expected. This can result in additional fees for a user, and the like. Accordingly, it would be advantageous to have a secondary number for use in completing recurring payments when issues are detected with a primary payment number.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical issues associated with seamlessly processing recurring payments when an issue is detected with primary payment information.

In some aspects, a user may request an account opening. Requesting the account opening may including requesting fail-safe event processing, providing necessary permissions to share user data, and the like. In response, an account may be opened or generated. Opening or generating the account may include generating a first account number associated with the account and/or a payment device of the account. The first account number may be transmitted or sent to the user. Further, opening the account may include generating a second account number different from the first account number. In some examples, the second account number may be a virtual account number and may be stored by the enterprise organization. The second account number may be stored in an inactive or deactivated state.

A user may schedule or request one or more recurring payments with one or more vendors or service providers. In scheduling or requesting the one or more recurring payments, the user may provide the first account number for use in processing the payments. Accordingly, one or more recurring payments may be processed using the first account number.

In some examples, an issue may be detected with the first account number, associated payment device, or the like. In response, a creditworthiness rating may be retrieved and compared to a threshold. If the score meets or exceeds the threshold, the second account number may be activated and used (e.g., by the enterprise organization) to process one or more recurring payments that may otherwise have lapsed due to the compromise of the first account number or payment device. A notification may be transmitted to the user indicating that the recurring payment was processed using the second account number.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 3 illustrates an illustrative method for implementing fail-safe event processing functions according to one or more aspects described herein;

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As discussed above, compromise of a payment device, account number, or the like, can cause users to miss recurring payments that are scheduled to be made with the compromised device or account number. Accordingly, aspects described herein provide fail-safe event processing functions when an issue is detected with a payment device or account number.

In some examples, when a user opens an account, the account may be generated, a first account number may be generated and, in some examples, a payment device (e.g., debit card, credit card, or the like) may be generated. The payment device may be associated with the first account number. Accordingly, if a user requests or schedules recurring payments (e.g., for monthly bill pay or the like), the user may provide the first account number for processing the recurring payments.

However, if an issue is detected, the recurring payment might not be completed using the first account number. Accordingly, when an account is opened, a second account number, different from the first account number, may be generated and stored by the enterprise organization (e.g., financial institution holding the account). The second account number may be stored in an inactive or disabled state. When an issue is detected (e.g., expiration of payment device, compromise of first account number, or the like), the enterprise organization may activate the second account number and use the second account number to complete recurring payments to avoid a lapse in payment by the user.

In some examples, a creditworthiness of the user may be evaluated before activating the second account number. The creditworthiness may be evaluated using a machine learning model trained using historical user factor data. The model may be executed using real-time or current data for the user as inputs to generate a creditworthiness determination.

These and various other arrangements will be discussed more fully below.

Figure 1A:
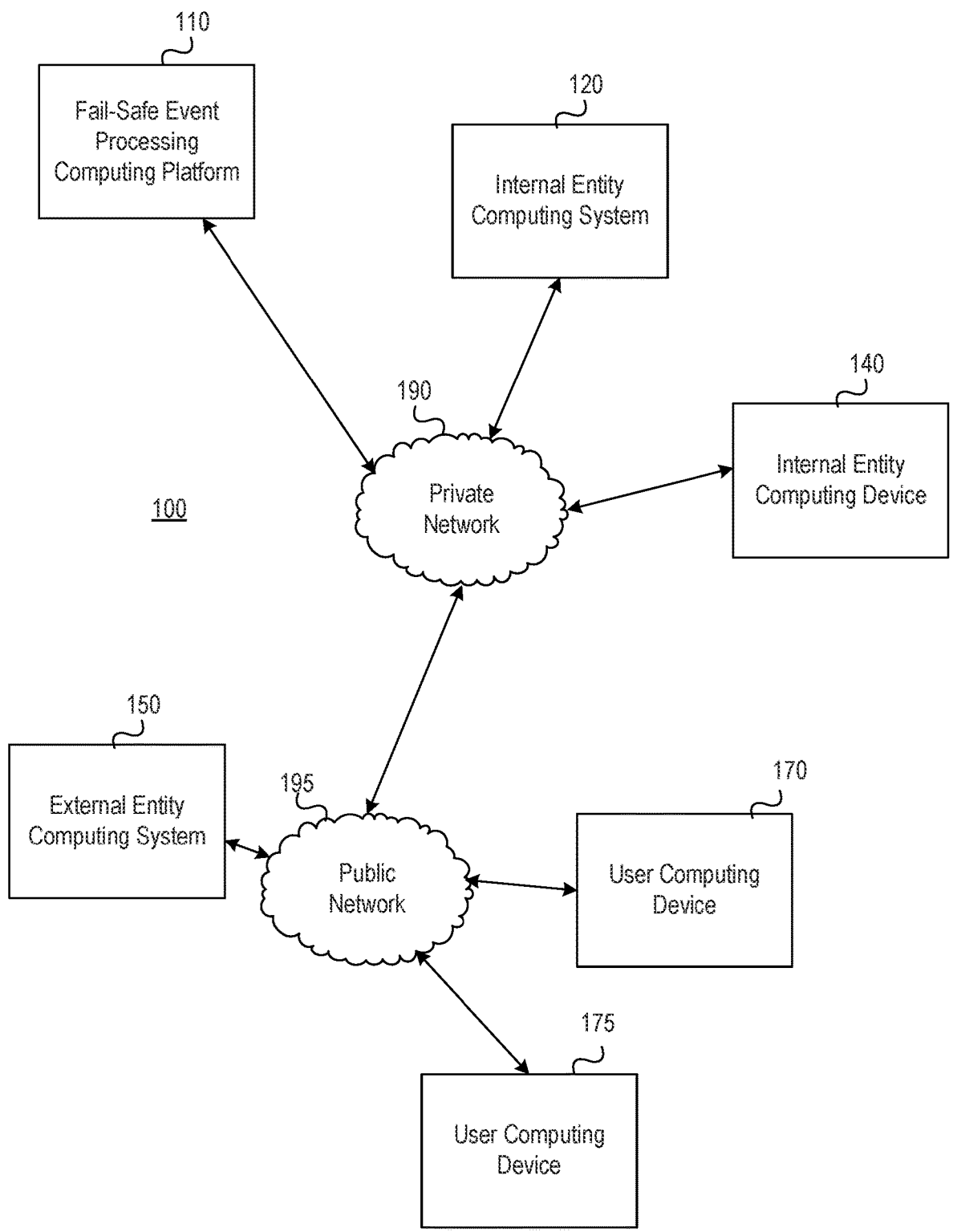
FIGS. 1A and 1B depict an illustrative computing environment for implementing fail-safe event processing functions in accordance with one or more aspects described herein.
Figure 1B:
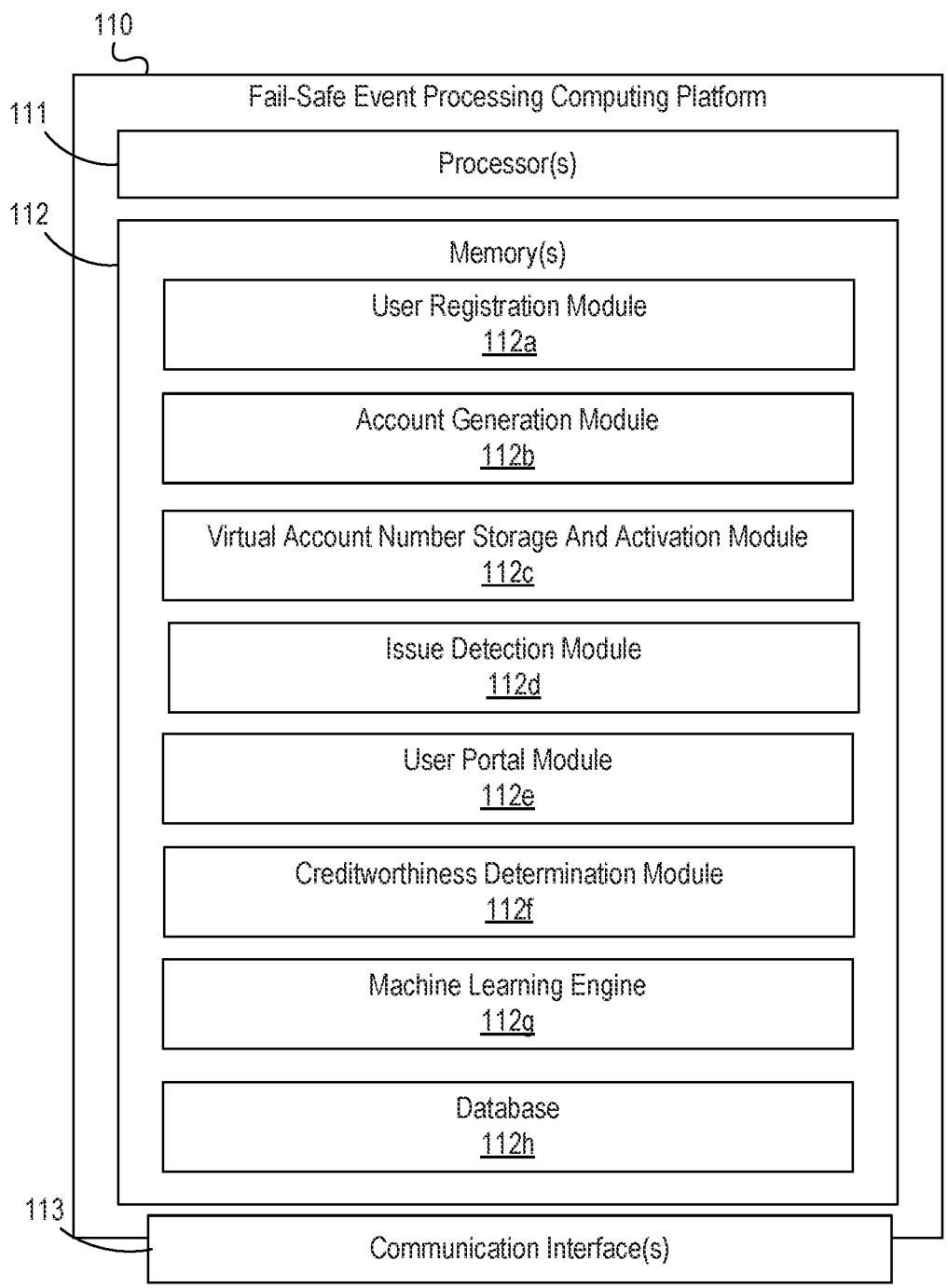

Aspects described herein may be implemented using one or more computing devices operating in a computing environment. For instance, FIGS. 1A-1B depict an illustrative computing environment for implementing fail-safe event processing functions in accordance with one or more aspects described herein. Referring to FIG. 1A, computing environment 100 may include one or more computing devices and/or other computing systems. For example, computing environment 100 may include fail-safe event processing computing platform 110, internal entity computing system 120, internal entity computing device 140, external entity computing system 150, user computing device 170, and/or user computing device 175. Although one internal entity computing system 120, one internal entity computing device 140, one external entity computing system 150, and two user computing devices 170, 175 are shown, any number of systems or devices may be used without departing from the invention.

Fail-safe event processing computing platform 110 may be configured to perform intelligent, dynamic, and efficient event processing in situations in which, for example, a payment card or device has been compromised. For instance, fail-safe event processing computing platform 110 may open or generate user accounts based on requests received from users. In some examples, fail-safe event processing computing platform 110 may generate a first account number associated with an account. The first account number may be associated with a payment device (e.g., debit card, credit card, or the like) and may, in some examples, appear on the device. The first account number and payment device may be sent to the user.

Fail-safe event processing computing platform 110 may further generate a second account number different from the first account number. In some examples, the second account number may be a virtual number that is stored by the enterprise organization holding the account in an inactive or deactivated state. In some examples, the second account number might not be sent to the user.

In some arrangements, the user may establish a recurring payment (e.g., via a user portal). The recurring payment may be, for instance, a bill payment, and the payment may be made using the first account number. Accordingly, one or more recurring payments may be made based on the request from the user.

In some examples, fail-safe event processing computing platform 110 may detect an issue with the payment device or first account number. For instance, an expiration date of the payment device may have passed, the payment device may have been compromised, or the like. Accordingly, when an issue is detected, fail-safe event processing computing platform 110 may activate the second account number and may use the second account number to process the established recurring payments to avoid a lapse in payment by the user.

In some examples, fail-safe event processing computing platform 110 may request and receive user data associated with creditworthiness of the user. For instance, data associated with factors such as timeliness of payments, length of relationship with the enterprise organization, balance in account, and the like, may be received and processed using, for instance, artificial intelligence or machine learning to determine a creditworthiness of the user. In some examples, fail-safe event processing computing platform 110 may determined creditworthiness on a continuous or periodic basis. The creditworthiness for a user for whom an issue has been detected may be retrieved and compared to one or more thresholds to determine whether to activate the second account number. For instance, a user may have a creditworthiness score that meets or exceeds a first threshold and, accordingly, the second account number may be activated and used to process the recurring payment. If the score does not meet the threshold, the user may be notified of the issue and a request for updated payment information may be provided.

Internal entity computing system 120 may be or include one or more computing devices (e.g., servers, server blades, or the like) and/or one or more computing components (e.g., memory, processor, and the like) and may be associated with or operated by an enterprise organization implementing the fail-safe event processing computing platform 110. The internal entity computing system 120 may store user account data, may process transactions (e.g., in conjunction with a vendor system), may update one or more account ledgers, and the like.

Internal entity computing device 140 may be or include one or more computing devices (e.g., desktop computers, laptop computers, tablet devices, mobile devices, smart phones, or the like) that may be used by or associated with one or more users (e.g., employees or affiliates of) the enterprise organization. Internal entity computing device 140 may, in some examples, be used by employees of the enterprise organization to control or update aspects of the user portal, monitor payment device issues and/or facilitate distribution of replacement devices, and the like.

External entity computing system 150 may be or include one or more computing devices (e.g., servers, server blades, or the like) and/or one or more computing components (e.g., memory, processor, and the like) and may be associated with or operated by an entity outside of or not associated with the enterprise organization. For instance, external entity computing system 150 may be associated with or operated by one or more vendors, service providers, or the like, and may be used to facilitate recurring payments from one or more users to the vendor, service provider, or the like.

User computing device 170 and/or user computing device 175 may be or include computing devices (e.g., laptop computing devices, desktop computing devices, tablet computing devices, mobile computing devices, and the like) operated by a user external to the enterprise organization, such as a customer of the enterprise organization. For instance, user computing device 170 and/or user computing device 175 may be associated with one or more users (e.g., the same user or different users) that may request opening an account, may request recurring payments, may receive and display notifications, and the like. For instance, user computing device 170 and/or user computing device 175 may be used to access a user portal to request and/or manage recurring payments.

As mentioned above, computing environment 100 also may include one or more networks, which may interconnect one or more of fail-safe event processing computing platform 110, internal entity computing system 120, internal entity computing device 140, external entity computing system 150, user computing device 170 and/or user computing device 175. For example, computing environment 100 may include private network 190 and public network 195. Private network 190 and/or public network 195 may include one or more sub-networks (e.g., Local Area Networks (LANs), Wide Area Networks (WANs), or the like). Private network 190 may be associated with a particular organization (e.g., a corporation, financial institution, educational institution, governmental institution, or the like) and may interconnect one or more computing devices associated with the organization. For example, fail-safe event processing computing platform 110, internal entity computing system 120, and/or internal entity computing device 140, may be associated with an enterprise organization (e.g., a financial institution), and private network 190 may be associated with and/or operated by the organization, and may include one or more networks (e.g., LANs, WANs, virtual private networks (VPNs), or the like) that interconnect fail-safe event processing computing platform 110, internal entity computing system 120, and/or internal entity computing device 140, and one or more other computing devices and/or computer systems that are used by, operated by, and/or otherwise associated with the organization. Public network 195 may connect private network 190 and/or one or more computing devices connected thereto (e.g., fail-safe event processing computing platform 110, internal entity computing system 120, internal entity computing device 140) with one or more networks and/or computing devices that are not associated with the organization. For example, external entity computing system 150, user computing device 170 and/or user computing device 175 might not be associated with an organization that operates private network 190 (e.g., because external entity computing system 150, user computing device 170 and/or user computing device 175 may be owned, operated, and/or serviced by one or more entities different from the organization that operates private network 190, one or more customers of the organization, one or more employees of the organization, public or government entities, and/or vendors of the organization, rather than being owned and/or operated by the organization itself), and public network 195 may include one or more networks (e.g., the internet) that connect external entity computing system 150, user computing device 170 and/or user computing device 175 to private network 190 and/or one or more computing devices connected thereto (e.g., of fail-safe event processing computing platform 110, internal entity computing system 120, and/or internal entity computing device 140).

Referring to FIG. 1B, fail-safe event processing computing platform 110 may include one or more processors 111, memory 112, and communication interface 113. A data bus may interconnect processor(s) 111, memory 112, and communication interface 113. Communication interface 113 may be a network interface configured to support communication between fail-safe event processing computing platform 110 and one or more networks (e.g., network 190, network 195, or the like). Memory 112 may include one or more program modules having instructions that when executed by processor(s) 111 cause fail-safe event processing computing platform 110 to perform one or more functions described herein and/or one or more databases that may store and/or otherwise maintain information which may be used by such program modules and/or processor(s) 111. In some instances, the one or more program modules and/or databases may be stored by and/or maintained in different memory units of fail-safe event processing computing platform 110 and/or by different computing devices that may form and/or otherwise make up fail-safe event processing computing platform 110.

For example, memory 112 may have, store and/or include user registration module 112a. User registration module 112a may store instructions and/or data that may cause or enable fail-safe event processing computing platform 110 to receive user requests to open or generate an account, receive user registration data to generate the account (e.g., name, contact information, unique identifier, financial data, and the like). In some examples, user registration module 112a may store user data (e.g., in database 112h, in internal entity computing system 120, or the like).

Fail-safe event processing computing platform 110 may further have, store and/or include account generation module 112b. Account generation module 112b may store instructions and/or data that may cause or enable the fail-safe event processing computing platform 110 to generate or open an account for a user (e.g., in response to a user request), generate a first account number associated with the account and associated, in some examples, with a payment device, generate a second account number, different from the first account number, and the like. In some examples, account generation module 112b may transmit or send the first account number and/or payment device to the user and may cause the second account number to be stored (e.g., in virtual account number storage and activation module 112c).

Fail-safe event processing computing platform 110 may further have, store, and/or include virtual account number storage and activation module 112c. Virtual account number storage and activation module 112c may store instructions and/or data that may cause or enable the fail-safe event processing computing platform 110 to store the generated second account number which may, in some examples, be a virtual account number, in an inactive or deactivated state. Upon detecting an issue with a payment device or account number of a user, the second account number may be activated and used to process recurring payments to avoid a lapse in payment by the user.

Fail-safe event processing computing platform 110 may further have, store and/or include issue detection module 112d. Issue detection module 112d may store instructions and/or data that may cause or enable the fail-safe event processing computing platform 110 to detect an issue with a user payment device or account and trigger fail-safe event processing. For instance, issue detection module 112d may detect unauthorized activity associated with a payment device, may receive a notification of unauthorized activity associated with a payment device, may detect that an expiration date has passed on a payment device, and the like, and may initiate or activate fail-safe functions.

Fail-safe event processing computing platform 110 may further have, store and/or include user portal module 112e. User portal module 112e may store instructions and/or data that may cause or enable the fail-safe event processing computing platform 110 to receive, via a user portal (e.g., mobile banking application, online banking portal, and the like) one or more user requests to set up, initiate and/or manage recurring payments. For instance, a user may request that a payment be made to one or more vendors or service providers (e.g., utility companies, credit card companies, or the like) on a monthly basis. The user may provide account information to facilitate payment that may include the first account number associated with the account (e.g., the account number associated with the payment device of the account). This account information may be used to facilitate processing of the recurring payment unless or until an issue is detected.

Fail-safe event processing computing platform 110 may further have, store and/or include creditworthiness determination module 112f. Creditworthiness determination module 112f may receive user factor data from one or more sources (e.g., internal entity computing system 120, user computing device 170, or the like) to evaluate creditworthiness of the user. In some examples, creditworthiness may be based on factors such as timeliness of payments, missed payments, length of relationship with the enterprise organization, and the like. In some examples, creditworthiness may be determined on a continuous basis or a periodic basis and a determined score may be retrieved to determine whether to activate the second account number upon detection of an issue.

In some examples, machine learning may be used to evaluate creditworthiness of a user. For instance, machine learning engine 112g may train, execute, and/or validate one or more machine learning models using user factor data as inputs to generate or output a creditworthiness score. For instance, the machine learning model may be trained using historical creditworthiness and user factor data (e.g., data indicating factors associated with highly creditworthy users and vice versa) to identify patterns or sequences of data in user factor data that may indicate a creditworthiness of the user. In some examples, the machine learning model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models Fail-safe event processing computing platform 110 may further have, store and/or include a database 112h that may store creditworthiness ratings or scores (e.g., outputs from the machine learning model), user account data, and the like.

FIGS. 2A-2G depict one example illustrative event sequence for implementing fail-safe event processing functions in accordance with one or more aspects described herein. The events shown in the illustrative event sequence are merely one example sequence and additional events may be added, or events may be omitted, without departing from the invention. Further, one or more processes discussed with respect to FIGS. 2A-2G may be performed in real-time or near real-time.

Figure 2A:
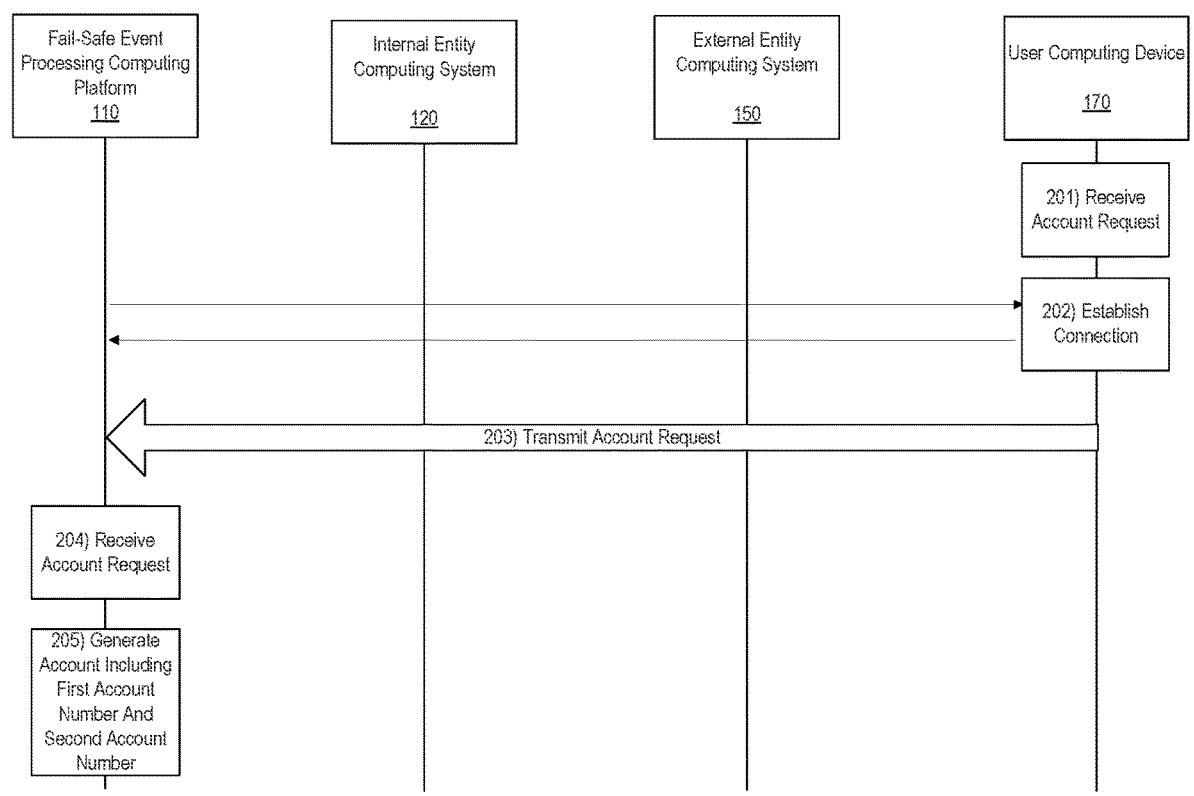
FIGS. 2A-2G depict an illustrative event sequence for implementing fail-safe event processing functions in accordance with one or more aspects described herein.

With reference to FIG. 2A, at step 201, an account request may be received by user computing device 170. For instance, a user may input, e.g., via a touchscreen, keypad or other input device, a request to open an account. The request may be input to a user portal hosted or operated by an enterprise organization, such as a financial institution. The request for account may include user identifying information, type of account information, and the like. In some examples, the user request for account may include a request to opt in to fail-safe payment arrangements described herein, permission to share bill payment information, and the like.

At step 202, user computing device 170 may connect to fail-safe event processing computing platform 110. For instance, a first wireless connection may be established between user computing device 170 and fail-safe event processing computing platform 110. Upon establishing the first wireless connection, a communication session may be initiated between user computing device 170 and fail-safe event processing computing platform 110.

At step 203, user computing device 170 may transmit or send the account request and associated data to the fail-safe event processing computing platform 110. For instance, the user computing device 170 may transmit or send the registration request and/or associated data during the communication session initiated upon establishing the first wireless connection.

At step 204, fail-safe event processing computing platform 110 may receive the account request. In some examples, fail-safe event processing computing platform 110 may evaluate the request and data received to ensure sufficient data is available to open or generate an account.

At step 205, fail-safe event processing computing platform 110 may, in response to receiving the request, may generate an account. Generating an account may include generating a first account number associated with the account and, for instance, a payment device of the account. In some examples, the first account number may be displayed on the payment device. Generating the account may further include generating a second account number associated with the account that is different from the first account number. In some examples, the second account number may be a virtual account number linked to the account but held by the enterprise organization in an inactive or deactivated state until a triggering event occurs. In some examples, the second account number might not be sent to the user (e.g., the user might not have access to the account number and, instead, the second account number may only be used by the enterprise organization to processing transactions in a fail-safe event).

Figure 2B:
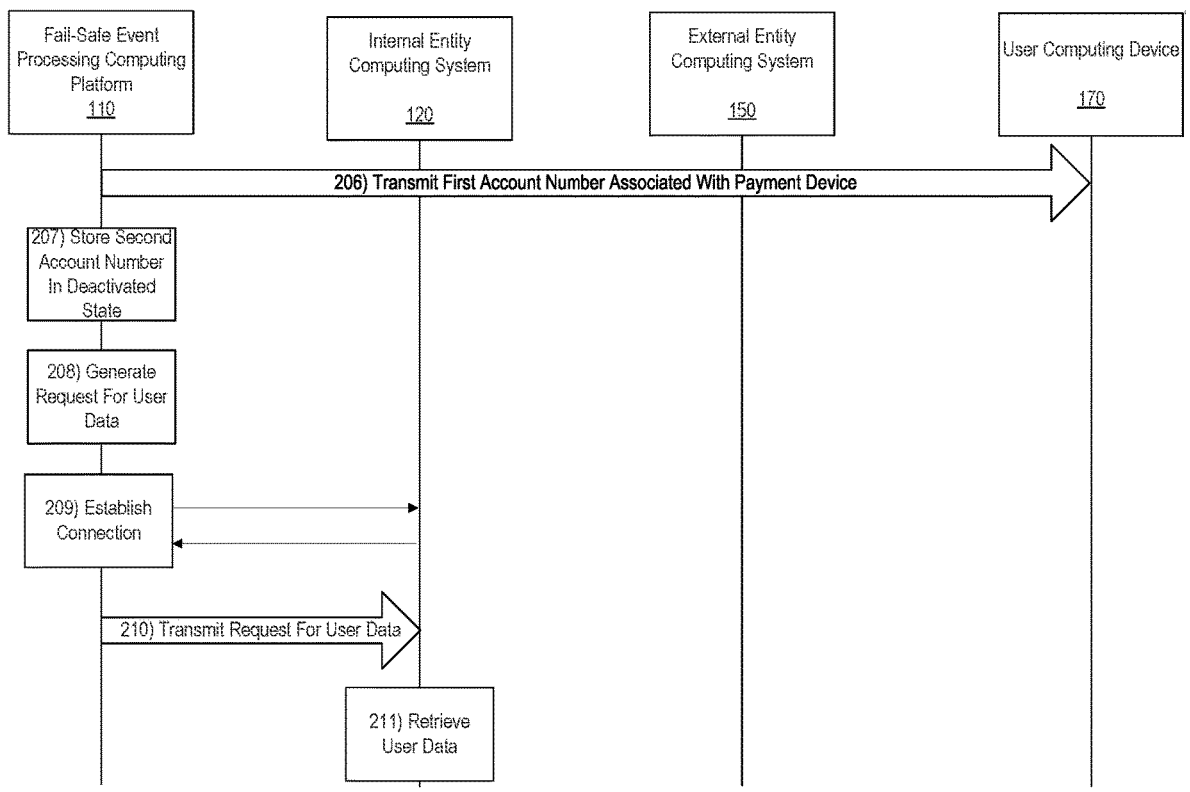

With reference to FIG. 2B, at step 206, fail-safe event processing computing platform 110 may transmit or send the first account number to the user computing device 170. In some examples, transmitting or sending the first account number may include sending the payment device associated with the account to the requesting user.

At step 207, fail-safe event processing computing platform 110 may store the generated second account number in an inactive or deactivated state.

At step 208, fail-safe event processing computing platform 110 may generate a request for user factor data. The request for user factor data may be generated continuously or on a periodic basis (e.g., once per day, once per hour, once per week, or the like). The data requested may include updated or real-time bill payment data of the user, standing of the user at the enterprise organization, and the like.

At step 209, fail-safe event processing computing platform 110 may connect to internal entity computing system 120. For instance, a second wireless connection may be established between fail-safe event processing computing platform 110 and internal entity computing system 120. Upon establishing the second wireless connection, a communication session may be initiated between fail-safe event processing computing platform 110 and internal entity computing system 120.

At step 210, the fail-safe event processing computing platform 110 may transmit or send the request for user factor data to the internal entity computing system 120. For instance, the request for user factor data may be transmitted or sent during the communication session initiated upon establishing the second wireless connection. Although the arrangements shown illustrate the request for user factor data being sent to internal entity computing system 120, in some examples, user factor data may be requested from more than one source, external sources as well as internal sources, and the like.

At step 211, internal entity computing system 120 may receive the request for user factor data and may retrieve the requested data. The retrieved data may be used to generated user factor response data.

Figure 2C:
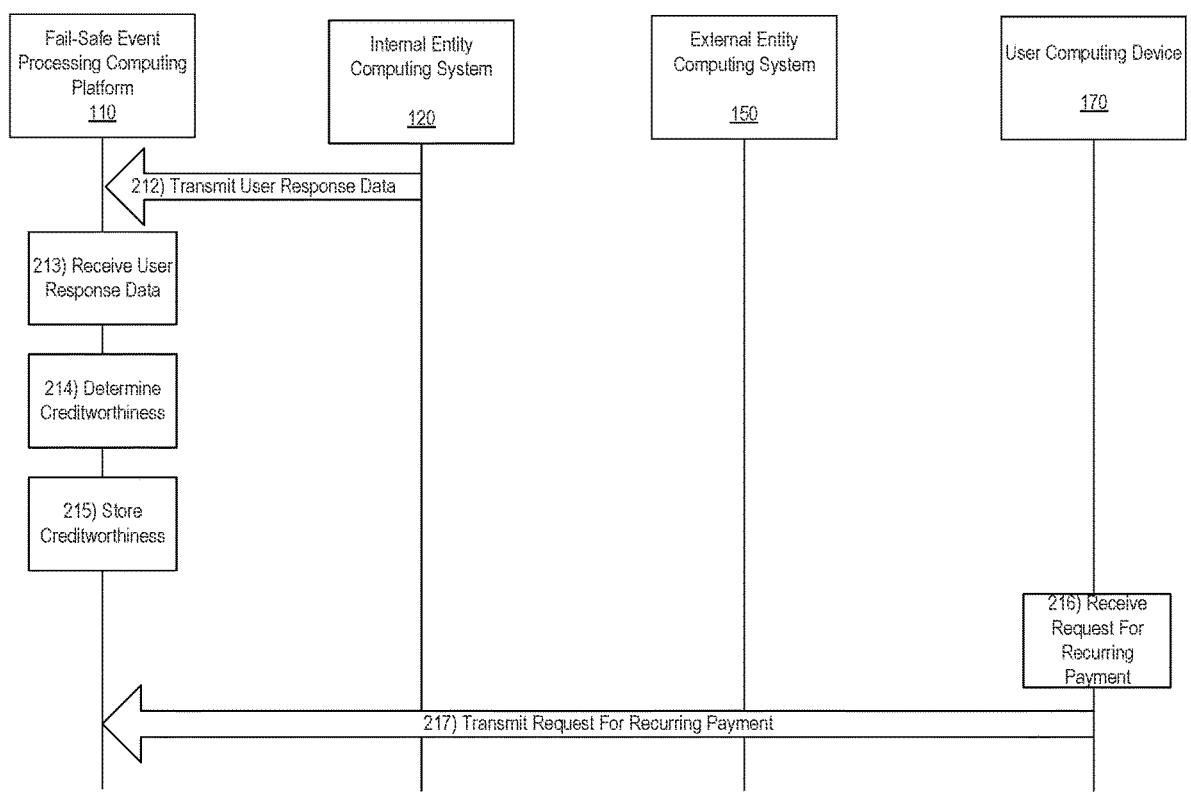

With reference to FIG. 2C, at step 212, internal entity computing system 120 may transmit or send the user factor response data to the fail-safe event processing computing platform 110.

At step 213, fail-safe event processing computing platform 110 may receive the user factor response data and may input the user factor response data into the machine learning model. The machine learning model may be executed and, at step 214, fail-safe event processing computing platform 110 may output or generate a creditworthiness score or rating for the user.

At step 215, fail-safe event processing computing platform 110 may store the determined creditworthiness score for the user. In some examples, storing the creditworthiness score may include overwriting a previous creditworthiness score for the user since the scores will be updated frequently based on recent data.

At step 216, user computing device 170 may receive a request to establish a recurring payment. For instance, a user may input into user computing device 170, a request to establish a recurring payment with one or more vendors, service providers, or the like. The request may include identification of the vendor or service provider, identification of the first account number to be used to process the payments, and the like. In some examples, the request may be input via a user portal hosted by the enterprise organization.

At step 217, user computing device 170 may transmit or send the request for recurring payment to the fail-safe event processing computing platform 110.

Figure 2D:
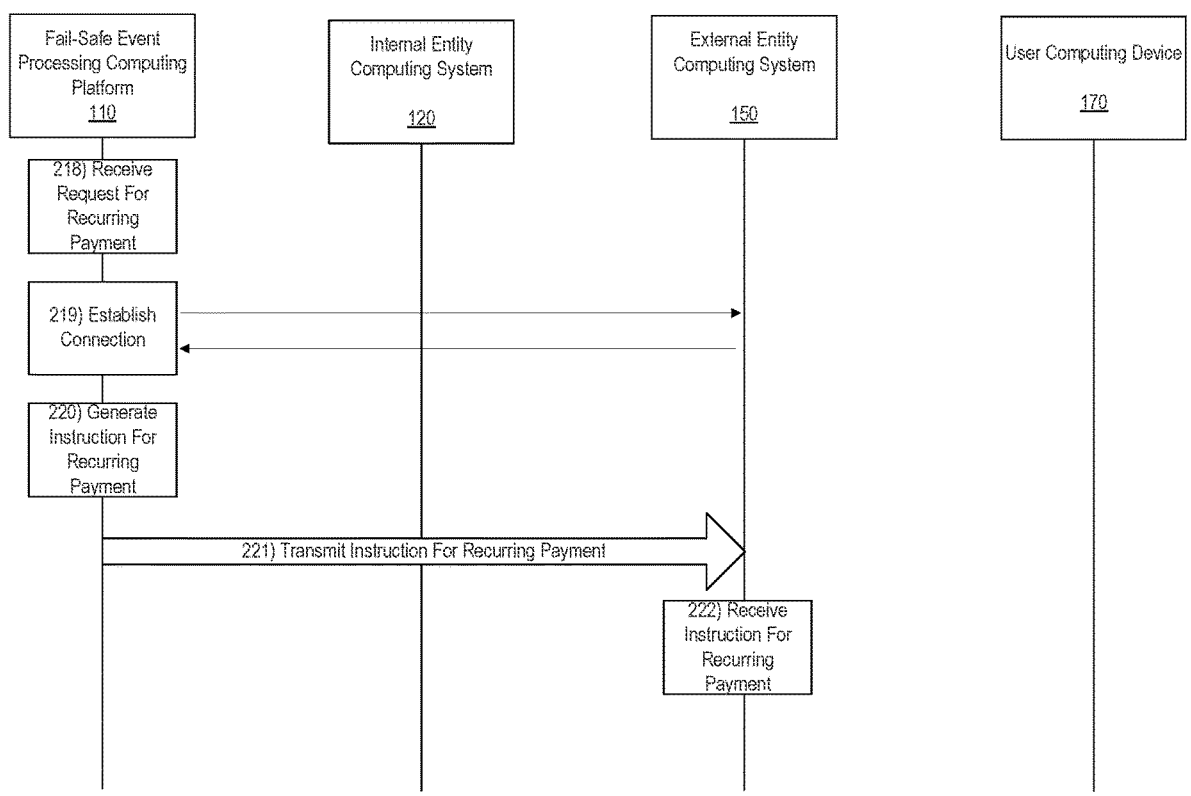

With reference to FIG. 2D, at step 218, fail-safe event processing computing platform 110 may receive the request for the recurring payment and may record the request and payment details.

At step 219, fail-safe event processing computing platform 110 may connect to external entity computing system 150. For instance, a third wireless connection may be established between fail-safe event processing computing platform 110 and external entity computing system 150. Upon establishing the third wireless connection, a communication session may be initiated between fail-safe event processing computing platform 110 and external entity computing system 150.

At step 220, fail-safe event processing computing platform 110 may generate an instruction for recurring payment. The instruction may include a payer, the first account number, and associated details.

At step 221, fail-safe event processing computing platform 110 may transmit or send the instruction for the recurring payment to the external entity computing system 150. For instance, the instruction for payment may be transmitted or sent during the communication session initiated upon establishing the third wireless connection.

At step 222, external entity computing system 150 may receive the request for recurring payment and may initiate the recurring payment.

Figure 2E:
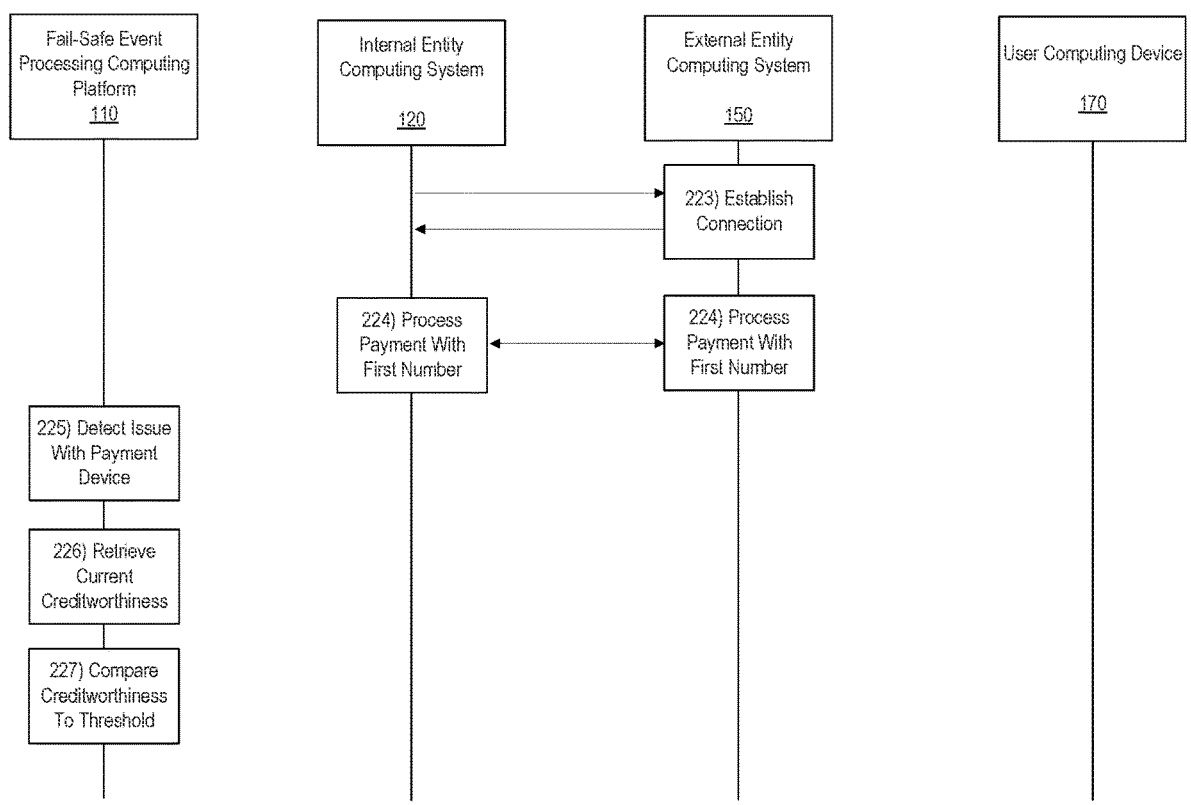

With reference to FIG. 2E, at step 223, external entity computing system 150 may connect to internal entity computing system 120. For instance, a fourth wireless connection may be established between external entity computing system 150 and internal entity computing system 120. Upon establishing the fourth wireless connection, a communication session may be initiated between external entity computing system 150 and internal entity computing system 120.

At step 224, an instance (e.g., a first instance or the like) of the recurring payment may be processed using the first account number provided by the user with the recurring payment request. For instance, data may be transmitted between external entity computing system 150 and internal entity computing system 120 to process the payment (e.g., deduct funds from the account, update an account ledger, and the like).

At step 225, fail-safe event processing computing platform 110 may detect an issue with the payment device of the account or the account in general. For instance, fail-safe event processing computing platform 110 may detect unauthorized activity on the payment device, may detect that an expiration date has passed, may receive a notification of unauthorized activity or expiration, or the like.

At step 226, fail-safe event processing computing platform 110 may retrieve a current creditworthiness score for the user. For instance, the fail-safe event processing computing platform 110 may retrieve a creditworthiness score for the user that may be based on recently received user factor data.

Figure 4:
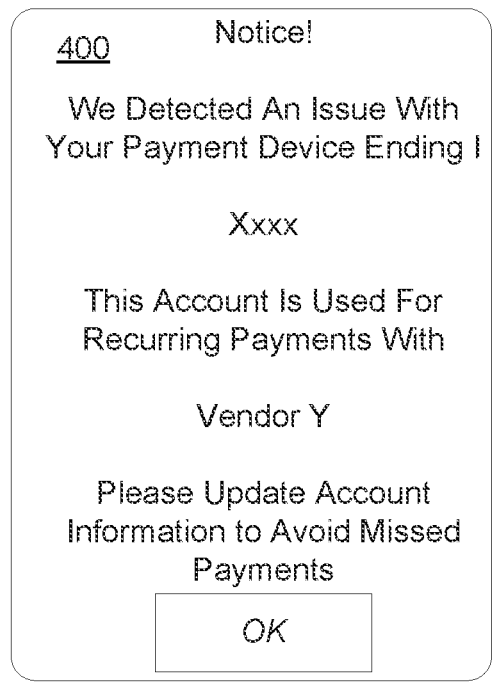
FIGS. 4 and 5 illustrate example user interfaces that may be generated in accordance with one or more aspects described herein.

At step 227, fail-safe event processing computing platform 110 may compare the creditworthiness score to one or more thresholds. For instance, the creditworthiness score may be compared to a threshold and, if the score meets or exceeds the threshold, fail-safe event processing may be initiated (e.g., the second account number activated, and the like). If the score does not meet or exceed the threshold, a notification may be generated and transmitted to the user computing device 170 indicating that an issue was detected and that updated account information should be provided to avoid lapse of recurring payments. FIG. 4 illustrates one example notification 400 that may be transmitted to the user. User interface 400 may include an indication of an issue, identification of the vendor to whom payment may lapse, and the like.

In some examples, more than one threshold may be used. For instance, the creditworthiness score may be compared to a first threshold and, if above that threshold but below a second threshold, fail-safe event processing may be initiated for payments below a predetermined amount (e.g., below $100, below $50, or the like). If the score is above the second threshold, fail-safe event processing may be initiated for payments of any amount. While the use of two thresholds is described, any number of thresholds and criteria for initiating fail-safe processing may be used without departing from the invention.

Figure 2F:
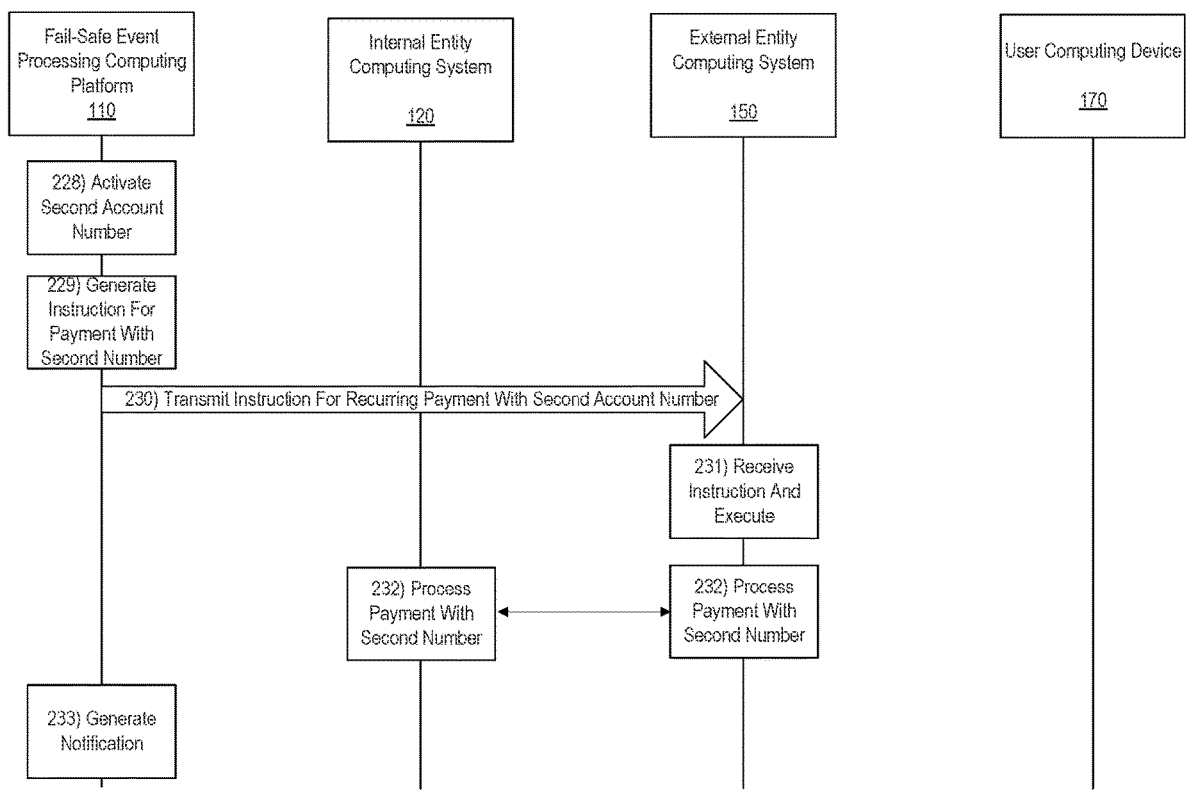

With reference to FIG. 2F, at step 228, fail-safe event processing computing platform 110 may retrieve the second account number from storage and may activate the second account number. In some examples, retrieving the second account number, activating it and using it to process the recurring payment may be performed automatically and without user interaction or request. Accordingly, the process may seamlessly ensure that recurring payments are not missed.

At step 229, fail-safe event processing computing platform 110 may generate an instruction to process subsequent recurring payments (e.g., recurring payments occurring after detection of the issue) using the second account number instead of the first. Accordingly, the payment may still be processed using a same user account but based on a virtual account number provided by the enterprise organization.

At step 230, fail-safe event processing computing platform 110 may transmit or send the instruction to process subsequent recurring payments using the second account number instead of the first account number to the external entity computing system 150. At step 231, external entity computing system 150 may receive and executing the instruction. For instance, executing the instruction may cause processing of any subsequent or later occurring recurring payments to be processed, in conjunction with the internal entity computing system 120, using the second account number at step 232. In some examples, the second account number may be used until the user identifies an updated account number for use in processing the recurring payment. In those arrangements, the second account number may be configured for multiple uses. Alternatively, the second account number may be configured for single use and the user may provide updated information after one payment processed using the second account number.

Further, although the arrangements shown illustrate the second account number being used for one recurring payment, in some examples, the second account number may be used to processing multiple recurring payments with a plurality of different vendors, service providers, and the like.

Figure 5:
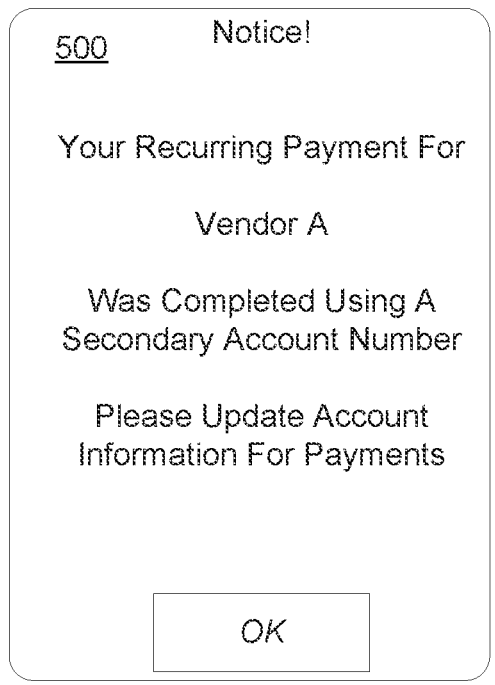

At step 233, fail-safe event processing computing platform 110 may generate a notification. In some examples, the notification may include an indication that the recurring payment was processed using a secondary account number since the first account number was compromised. FIG. 5 illustrates one example notification 500 that may be generated. The user interface 500 includes an indication that the payment was made, the vendor to whom the payment was made, and a request to update the user's account information for future payments.

Figure 2G:
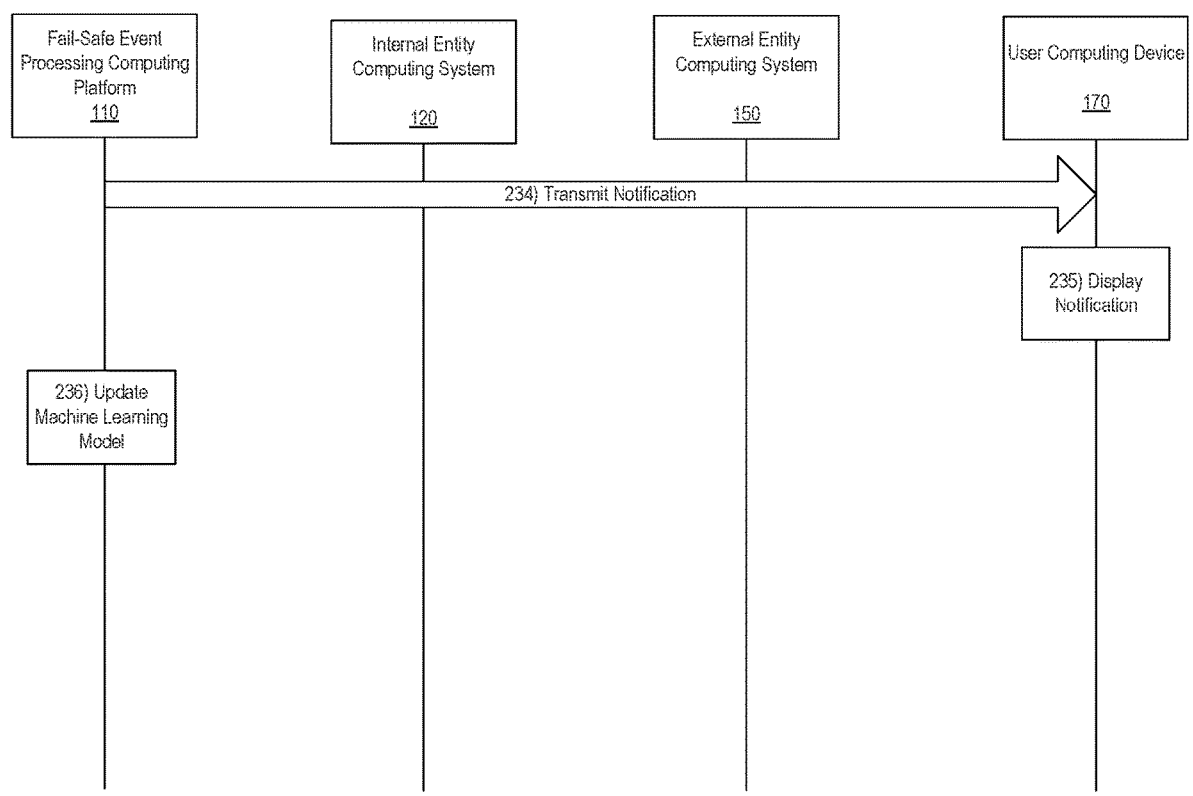

With reference to FIG. 2G, at step 234, fail-safe event processing computing platform 110 may transmit or send the generated notification to user computing device 170. In some examples, sending the notification may cause the notification to be displayed on a display of user computing device 170.

At step 235, user computing device 170 may receive and display the notification.

At step 236, the machine learning model may be updated or validated using subsequently received data. For instance, data associated with the payments made using the second account number, whether they were successful or failed, or the like, may be used to update or validate the machine learning model used to determine creditworthiness. Accordingly, the machine learning model may be continuously updated and accuracy improved.

FIG. 3 is a flow chart illustrating one example method of implementing fail-safe event processing functions in accordance with one or more aspects described herein. The processes illustrated in FIG. 3 are merely some example processes and functions. The steps shown may be performed in the order shown, in a different order, more steps may be added, or one or more steps may be omitted, without departing from the invention. In some examples, one or more steps may be performed simultaneously with other steps shown and described. One of more steps shown in FIG. 3 may be performed in real-time or near real-time.

At step 300, an account request may be received. For instance, fail-safe event processing computing platform 110 may receive, from user computing device 170, a request to open an account. The request may include user identifying information, type of account information, and the like. In some examples, the request for account may include one or more user preferences, permissions, and the like. For instance, the user may opt-in to the fail-safe event processing arrangements described herein, may provide permission to assess creditworthiness based on current user data, and the like.

At step 302, responsive to receiving the request, the fail-safe event processing computing platform 110 may generate the requested account. Generating the requested account may include opening the account, adding the account to an account ledger system and generating a first account number associated with the account. In some arrangements, the first account number may be associated with a payment device, such as a debit card, credit card, or the like, and, in some examples, the first account number may appear on the payment device with other information (e.g., expiration date of payment device, card verification value (CVV), name of user, or the like). Further, a second account number associated with the account may be generated. The second account number may be different from the first account number and, in some examples, may be a virtual account number.

At step 304, the fail-safe event processing computing platform may transmit the first account number (and additional information such as the payment device) to the user. Accordingly, the user may use the first account number to process transactions, such as purchases, recurring payments, and the like, using the account associated with the first account number.

At step 306, fail-safe event processing computing platform 110 may store the second account number in an inactive or deactivated state. For instance, the second account number may be stored by the fail-safe event processing computing platform 110 or other device associated with the enterprise organization holding the account. In some examples, the second account number might not be transmitted to the user.

At step 308, fail-safe event processing computing platform 110 may receive, from the user computing device 170 and via a user portal, a request to initiate one or more recurring payments. For instance, a user may sign up for "bill pay" via the enterprise organization (e.g., via the fail-safe event processing computing platform 110) which may initiate regular payments to one or more vendors, service providers, or the like (e.g., on a monthly basis, on a quarterly basis, on a predetermined schedule of dates, or the like). In requesting the recurring payment, the user may provide the first account number associated with the account. The first account number may then be used to process the payment between the enterprise organization and the vendor or service provider.

At step 310, a first recurring payment may be processed using the first account number. In some examples, one or more recurring payments may be processed using the first account number before an issue may be detected.

At step 312, fail-safe event processing computing platform 110 may detect an issue with the payment device associated with the account, with the first account number, or the like. For instance, unauthorized activity may be detected associated with the payment device. In another example, an expiration date of the payment device may have passed, which may prevent the payment device (e.g., first account number) from being used to process any recurring payments associated with the payment device/first account number.

At step 314, fail-safe event processing computing platform 110 may retrieve a creditworthiness score associated with the user. For instance, a creditworthiness score may be determined (e.g., using machine learning) based on various user factor data. The creditworthiness score may be stored and may be updated continuously, as user factor data changes, on a periodic basis, or the like.

At step 316, the retrieved creditworthiness score may be compared to a creditworthiness threshold. At step 318, a determination may be made as to whether the retrieved creditworthiness score meets or exceeds the threshold. If, at step 318, the creditworthiness score meets or exceeds the threshold, at step 320, fail-safe event processing computing platform 110 may activate or enable the second account number. Activating or enabling the second account number may permit it to be used to process transactions for the user and by the enterprise organization (e.g., without user interaction).

At step 322, fail-safe event processing computing platform 110 may process a second or subsequent recurring payment using the second account number instead of the first account number for which an issue was detected. Accordingly, the recurring payment of the user may be seamlessly processed automatically using the second account number.

At step 324, fail-safe event processing computing platform 110 may generate a first notification. The first notification may include an indication that an issue was detected with the payment device or first account number but that the recurring payment was processed using a secondary account number. At step 326, the first notification may be transmitted to the user computing device. In some examples, transmitting the first notification to the user computing device may cause the user computing device to display the notification on a display of the user computing device.

If, at step 318, the creditworthiness score does not meet or exceed the threshold, at step 328, fail-safe event processing computing platform 110 may generate a second notification different from the first notification. In some examples, the second notification may include an indication that an issue was detected with the payment device or first account number and that the scheduled recurring payment might not be processed. The second notification may further include a request or instruction for the user to update account information associated with the recurring payment.

At step 330, fail-safe event processing computing platform 110 may transmit or send the second notification to the user computing device 170. In some examples, sending the second notification to the user computing device 170 may cause the user computing device 170 to display the second notification on a display of the user computing device 170.

Accordingly, aspects described herein provide seamless, fail-safe processing of recurring payments when a payment device or user account number has been compromised. By generating the second account number and storing the account number at the enterprise organization, the second account number may be easily retrievable to processing a recurring payment and a likelihood of the second account number being compromised is low. Further, by generating the second account number when an account is opened but holding the second account number in an inactive or deactivated state, the second account number may be ready for use when needed. In some examples, an inactive or deactivated state may render the second account number disabled (e.g., one or more flags associated with the second account number may indicate it is not available for use). Accordingly, by activating the second account number, the one or more flags may be modified to indicate the second account number is available for use.

Further, aspects described herein may evaluate a creditworthiness of a user prior to implementing the arrangements described herein, thereby reducing risk to the enterprise organization. For instance, creditworthiness may be evaluated (e.g., based on real-time, current or recent data) to determine whether to process a recurring payment using the second account number. In some examples, the user may be presented with terms of the fail-safe event processing system upon requesting an account or opting in to the system and may be made aware of the evaluation of creditworthiness prior to processing. Accordingly, if user data does not indicate sufficient creditworthiness, the system may inform the user of the issue with the payment device or account number associated with the recurring payment and may request updated information to process recurring payments (e.g., without a lapse in payment) without using the second account number.

As discussed herein, artificial intelligence and/or machine learning may be used to accurately evaluate creditworthiness of users. Accordingly, real-time or near real-time creditworthiness of users may be used to evaluate users and one or more machine learning models may be continuously updated to improve accuracy of predicted creditworthiness.

As discussed, in some examples, the first account number may be transmitted to the user while the second account number or stored or maintained by the enterprise organization. In some examples, the second account number might not be transmitted to the user and/or the user might not be aware of the second account number (e.g., the user may elect fail-safe event processing but may be unaware of how it is performed). Accordingly, the user might not be able to use the second account number for purchases (e.g., online purchases, in person purchases, or the like), requesting additional recurring payments, or the like. In some examples, only the enterprise organization may use the second account number and, in at least some examples, only to process recurring payments to avoid a lapse in payment by the user.

As discussed herein, aspects may be used with payment devices such as debit cards, credit cards, and the like. Detection of an issue may include unauthorized activity on the payment device, loss of payment device, cancellation of payment device, expiration of payment device, compromise of first account number, or the like.

Figure 6:
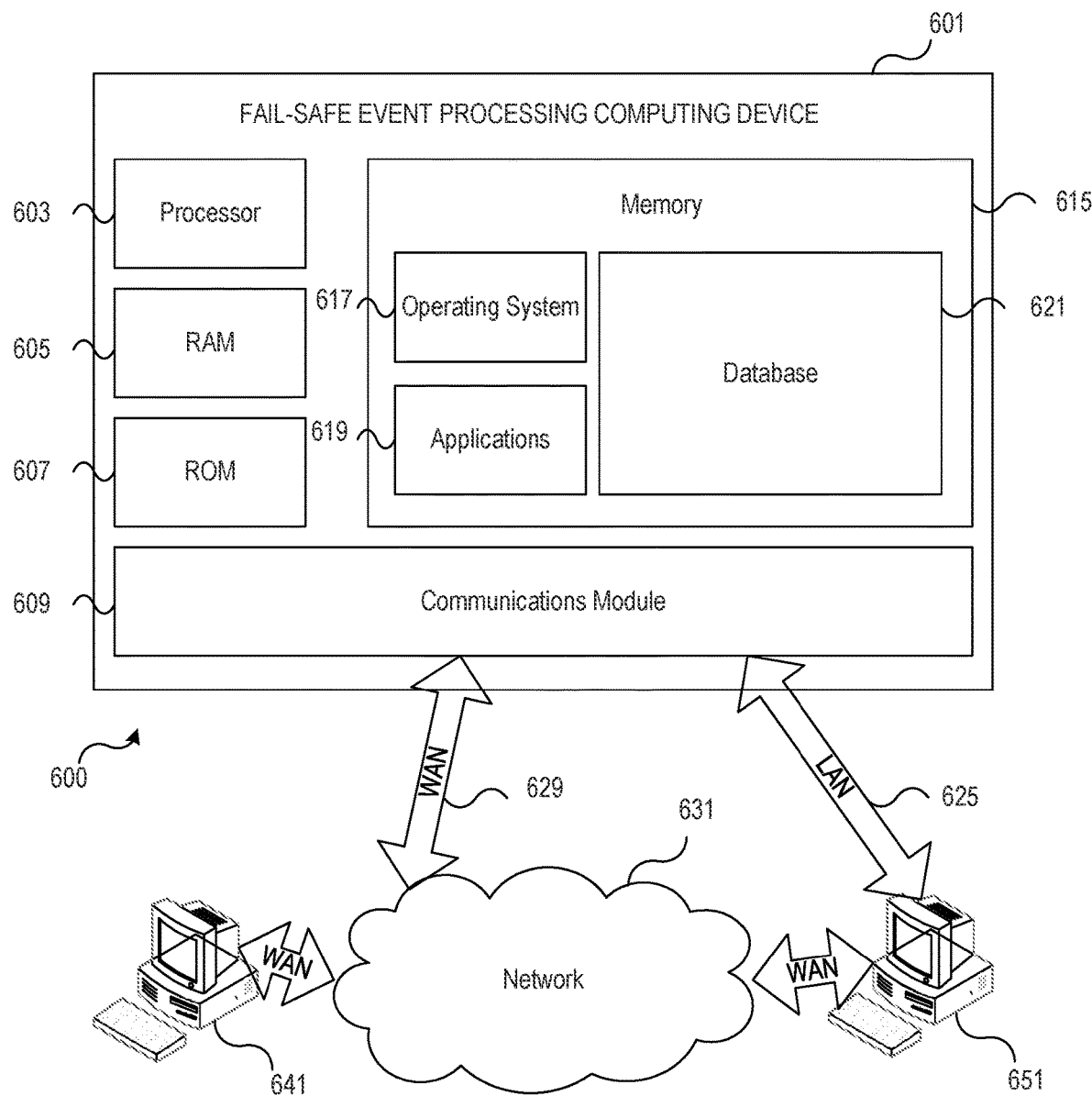
FIG. 6 illustrates one example environment in which various aspects of the disclosure may be implemented in accordance with one or more aspects described herein.

FIG. 6 depicts an illustrative operating environment in which various aspects of the present disclosure may be implemented in accordance with one or more example embodiments. Referring to FIG. 6, computing system environment 600 may be used according to one or more illustrative embodiments. Computing system environment 600 is only one example of a suitable computing environment and is not intended to suggest any limitation as to the scope of use or functionality contained in the disclosure. Computing system environment 600 should not be interpreted as having any dependency or requirement relating to any one or combination of components shown in illustrative computing system environment 600.

Computing system environment 600 may include fail-safe event processing computing device 601 having processor 603 for controlling overall operation of fail-safe event processing computing device 601 and its associated components, including Random Access Memory (RAM) 605, Read-Only Memory (ROM) 607, communications module 609, and memory 615. Fail-safe event processing computing device 601 may include a variety of computer readable media. Computer readable media may be any available media that may be accessed by fail-safe event processing computing device 601, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by fail-safe event processing computing device 601.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed on a processor on fail-safe event processing computing device 601. Such a processor may execute computer-executable instructions stored on a computer-readable medium.

Software may be stored within memory 615 and/or storage to provide instructions to processor 5603 for enabling fail-safe event processing computing device 601 to perform various functions as discussed herein. For example, memory 615 may store software used by fail-safe event processing computing device 601, such as operating system 617, application programs 619, and associated database 621. Also, some or all of the computer executable instructions for fail-safe event processing computing device 601 may be embodied in hardware or firmware. Although not shown, RAM 605 may include one or more applications representing the application data stored in RAM 605 while fail-safe event processing computing device 601 is on and corresponding software applications (e.g., software tasks) are running on fail-safe event processing computing device 601.

Communications module 609 may include a microphone, keypad, touch screen, and/or stylus through which a user of fail-safe event processing computing device 601 may provide input, and may also include one or more of a speaker for providing audio output and a video display device for providing textual, audiovisual and/or graphical output. Computing system environment 600 may also include optical scanners (not shown).

Fail-safe event processing computing device 601 may operate in a networked environment supporting connections to one or more remote computing devices, such as computing device 641 and 651. Computing devices 641 and 651 may be personal computing devices or servers that include any or all of the elements described above relative to fail-safe event processing computing device 601.

The network connections depicted in FIG. 6 may include Local Area Network (LAN) 625 and Wide Area Network (WAN) 629, as well as other networks. When used in a LAN networking environment, fail-safe event processing computing device 601 may be connected to LAN 625 through a network interface or adapter in communications module 609. When used in a WAN networking environment, fail-safe event processing computing device 601 may include a modem in communications module 609 or other means for establishing communications over WAN 629, such as network 531 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A computing platform, comprising:
   at least one processor;
   a communication interface communicatively coupled to the at least one processor; and
   a memory storing computer-readable instructions that, when executed by the at least one processor, cause the computing platform to:
      train a machine learning model, wherein training the machine learning model includes using historical creditworthiness data and user factor data to identify patterns or sequences in subsequent user factor data to determine a current creditworthiness of a user;
      receive, by an enterprise organization and from a user, a request to register, the request to register including a request to open an account;
      responsive to receiving the request to register, generate an account for the user, generating the account including generating a first account number associated with the account and provided to the user and a second, virtual account number, different from the first account number and associated with the account and not provided to the user;
      transmit, to the user, the first account number, wherein the first account number is associated with a payment device of the account;
      store, by the enterprise organization, the second, virtual account number in a deactivated state;
      receive, via a user portal, a request to initiate a recurring payment from the account, the request to initiate the recurring payment including the first account number;
      process a first instance of the recurring payment using the first account number;
      detect an issue with at least one of: the payment device associated with the account or the first account number;
      responsive to detecting the issue:
         execute, in real-time, the machine learning model using, as inputs, current user factor data, to output the current creditworthiness score associated with the user;
         store the determined current creditworthiness score associated with the user, wherein storing the determined current creditworthiness score associated with the user includes overwriting a previous creditworthiness score associated with the user; and
         compare the current creditworthiness score to a creditworthiness threshold;
      responsive to determining that the current creditworthiness score meets or exceeds the creditworthiness threshold:
         activate the second, virtual account number;
         process a second, subsequent instance of the recurring payment using the activated second, virtual account number;
         generate a first notification indicating that the second, subsequent instance of the recurring payment was processed;
         transmit the generated first notification to a computing device of the user, wherein transmitting the generated first notification causes the first notification to be displayed on a display of the computing device of the user; and
         update, based on the processing the second, subsequent instance of the recurring payment using the activated second, virtual account number, the machine learning model;
      responsive to determining that the current creditworthiness score does not meet or exceed the creditworthiness threshold:
         generate a second notification indicating that the issue was detected and requesting user input; and
         transmit the second notification to the computing device of the user, wherein transmitting the second notification causes the second notification to be displayed on the display of the computing device of the user.

2. The computing platform of claim 1, further including instructions that, when executed, cause the computing platform to
retrieve the user factor data.

3. The computing platform of claim 1, wherein executing the machine learning model is continuously performed.

4. The computing platform of claim 1, wherein executing the machine learning model is performed on a predetermined schedule for the user.

5. The computing platform of claim 1, wherein detecting an issue with at least one of: the payment device associated with the account or the first account number includes one of: detecting expiration of the payment device or detecting unauthorized use of the payment device.

6. The computing platform of claim 1, wherein the requested user input includes updated account information.

7. A method, comprising:
   training, by a computing platform of an enterprise organization, the computing platform having at least one processor and memory, a machine learning model, wherein training the machine learning model includes using historical creditworthiness data and user factor data to identify patterns or sequences in subsequent user factor data to determine a current creditworthiness of a user;

receiving, by the at least one processor, and from a user, a request to register, the request to register including a request to open an account;
responsive to receiving the request to register, generating, by the at least one processor, an account for the user, generating the account including generating a first account number associated with the account and provided to the user and a second, virtual account number, different from the first account number and associated with the account and not provided to the user;
transmitting, by the at least one processor and to the user, the first account number, wherein the first account number is associated with a payment device of the account;
storing, by the at least one processor of the enterprise organization, the second, virtual account number in a deactivated state;
receiving, by the at least one processor and via a user portal, a request to initiate a recurring payment from the account, the request to initiate the recurring payment including the first account number;
processing, by the at least one processor, a first instance of the recurring payment using the first account number;
detecting, by the at least one processor, an issue with at least one of: the payment device associated with the account or the first account number;
responsive to detecting the issue:
execute, by the at least one processor and in real-time, the machine learning model using, as inputs, current user factor data, to output the current creditworthiness score associated with the user;
storing, by the at least one processor, the determined current creditworthiness score associated with the user, wherein storing the determined current creditworthiness score associated with the user includes overwriting a previous creditworthiness score associated with the user; and
compare, by the at least one processor, the current creditworthiness score to a creditworthiness threshold;
responsive to determining that the current creditworthiness score meets or exceeds the creditworthiness threshold:
activate, by the at least one processor, the second, virtual account number;
process, by the at least one processor, a second, subsequent instance of the recurring payment using the activated second, virtual account number;
generate, by the at least one processor, a first notification indicating that the second, subsequent instance of the recurring payment was processed;
transmit, by the at least one processor, the generated first notification to a computing device of the user, wherein transmitting the generated first notification causes the first notification to be displayed on a display of the computing device of the user; and
updating, by the at least one processor and based on the processing the second, subsequent instance of the recurring payment using the activated second, virtual account number, the machine learning model;
responsive to determining that the current creditworthiness score does not meet or exceed the creditworthiness threshold:
generate, by the at least one processor, a second notification indicating that the issue was detected and requesting user input; and
transmit, by the at least one processor, the second notification to the computing device of the user, wherein transmitting the second notification causes the second notification to be displayed on the display of the computing device of the user.

8. The method of claim 7, further including:
retrieving, by the at least one processor, the user factor data.

9. The method of claim 7, wherein executing the machine learning model is continuously performed.

10. The method of claim 7, wherein executing the machine learning model is performed on a predetermined schedule for the user.

11. The method of claim 7, wherein detecting an issue with at least one of: the payment device associated with the account or the first account number includes one of: detecting expiration of the payment device or detecting unauthorized use of the payment device.

12. The method of claim 7, wherein the requested user input includes updated account information.

13. One or more non-transitory computer-readable media storing instructions that, when executed by a computing platform comprising at least one processor, memory, and a communication interface, cause the computing platform to:
train a machine learning model, wherein training the machine learning model includes using historical creditworthiness data and user factor data to identify patterns or sequences in subsequent user factor data to determine a current creditworthiness of a user;
receive, by an enterprise organization and from a user, a request to register, the request to register including a request to open an account;
responsive to receiving the request to register, generate an account for the user, generating the account including generating a first account number associated with the account and provided to the user and a second, virtual account number, different from the first account number and associated with the account and not provided to the user;
transmit, to the user, the first account number, wherein the first account number is associated with a payment device of the account;
store, by the enterprise organization, the second, virtual account number in a deactivated state;
receive, via a user portal, a request to initiate a recurring payment from the account, the request to initiate the recurring payment including the first account number;
process a first instance of the recurring payment using the first account number;
detect an issue with at least one of: the payment device associated with the account or the first account number;
responsive to detecting the issue:
execute, in real-time, the machine learning model using, as inputs, current user factor data, to output the current creditworthiness score associated with the user;
store the determined current creditworthiness score associated with the user, wherein storing the determined current creditworthiness score associated with the user includes overwriting a previous creditworthiness score associated with the user; and
compare the current creditworthiness score to a creditworthiness threshold;
responsive to determining that the current creditworthiness score meets or exceeds the creditworthiness threshold:
activate the second, virtual account number;

process a second, subsequent instance of the recurring payment using the activated second, virtual account number;

generate a first notification indicating that the second, subsequent instance of the recurring payment was processed;

transmit the generated first notification to a computing device of the user, wherein transmitting the generated first notification causes the first notification to be displayed on a display of the computing device of the user; and update, based on the processing the second, subsequent instance of the recurring payment using the activated second, virtual account number, the machine learning model;

responsive to determining that the current creditworthiness score does not meet or exceed the creditworthiness threshold:

generate a second notification indicating that the issue was detected and requesting user input; and transmit the second notification to the computing device of the user, wherein transmitting the second notification causes the second notification to be displayed on the display of the computing device of the user.

14. The one or more non-transitory computer-readable media of claim 13, further including instructions that, when executed, cause the computing platform to retrieve the user factor data.

15. The one or more non-transitory computer-readable media of claim 13, wherein detecting an issue with at least one of: the payment device associated with the account or the first account number includes one of: detecting expiration of the payment device or detecting unauthorized use of the payment device.

* * * * *